UNITED STATES PATENT OFFICE.

HENRY THOMAS SMITH, OF COOKE COUNTY, TEXAS.

VARNISH.

SPECIFICATION forming part of Letters Patent No. 322,016, dated July 14, 1885.

Application filed May 27, 1884. (No specimens.)

*To all whom it may concern:*

Be it known that I, HENRY THOMAS SMITH, a citizen of the United States, residing in the county of Cooke and State of Texas, have invented a new and useful Varnish to be used on Wood, Metal, &c., of which the following is a specification.

First, my varnish will endure more sun-rays than any other varnish and never crack or blister; second, cold or scalding water has no effect on it, and it can be used for inside or outside work; third, aqua-ammonia, nitric or tartaric acid have no effect on it in any way; fourth, it has elastic body, and can be used for roofing or flooring; fifth, black mud does not affect as much as other mud; sixth, it should not be handled under twenty hours after applied.

My varnish is composed of the following ingredients, combined in the proportions stated, viz: copal varnish, one-half gallon; coach varnish, one and one-half pint; japan varnish, one pint; alcohol, one pint; boiled linseed oil, one-half pint; nitric acid, one ounce; gum-shellac, two ounces; antimonial wine, one ounce; aqua-ammonia, one ounce; English rosin, one pound; oil of turpentine, three pints. The above makes one and one-half gallon.

What I claim, and desire to secure by Letters Patent of the United States, is—

The herein-described composition of matter to be used as a water-proof varnish, consisting of copal varnish, coach varnish, Japan varnish, alcohol, boiled linseed oil, nitric acid, gum-shellac, antimonial wine, aqua-ammonia, English rosin, and oil of turpentine, in the proportions specified.

HENRY THOMAS SMITH.

Witnesses:
JAMES LARKIN,
A. L. BROOKS,
JULIAN FULTON.